United States Patent
Bryan et al.

(10) Patent No.: US 10,558,947 B2
(45) Date of Patent: Feb. 11, 2020

(54) SYSTEM AND METHOD FOR MANAGEMENT OF PERPETUAL INVENTORY VALUES BASED UPON FINANCIAL ASSUMPTIONS

(71) Applicant: Walmart Apollo, LLC, Bentonville, AR (US)

(72) Inventors: Greg A. Bryan, Centerton, AR (US); Cristy C. Brooks, Cassville, MO (US); David B. Brightwell, Bentonville, AR (US); Benjamin D. Enssle, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/917,942

(22) Filed: Mar. 12, 2018

(65) Prior Publication Data

US 2018/0268365 A1    Sep. 20, 2018

Related U.S. Application Data

(60) Provisional application No. 62/471,437, filed on Mar. 15, 2017.

(51) Int. Cl.
*G06Q 10/08* (2012.01)
*G06Q 40/00* (2012.01)

(52) U.S. Cl.
CPC ......... *G06Q 10/0875* (2013.01); *G06Q 40/12* (2013.12)

(58) Field of Classification Search
None
See application file for complete search history.

(56) References Cited

U.S. PATENT DOCUMENTS

| | | |
|---|---|---|
| 5,963,919 A | 10/1999 | Brinkley |
| 7,222,786 B2 | 5/2007 | Renz |

(Continued)

FOREIGN PATENT DOCUMENTS

| | | |
|---|---|---|
| EP | 1901215 | 3/2008 |
| WO | 2015184286 | 12/2015 |
| WO | 2016109251 | 7/2016 |

OTHER PUBLICATIONS

Angell, Robert C., Control of State-Wide Liquor Inventories, Feb. 15, 1948, National Association of Cost Accountants.NACA Bulletin(pre-1986) 29.12:751. Institute of Management Accountants (Year: 1948).*

(Continued)

*Primary Examiner* — Nathan C Uber
*Assistant Examiner* — Denisse Y Ortiz Roman
(74) *Attorney, Agent, or Firm* — Fitch, Even, Tabin & Flannery LLP

(57) ABSTRACT

A book inventory monetary value of a selected product in the retail store is received. The book inventory monetary value is the monetary value of the selected product according to the accounting records of a retail store. A perpetual inventory (PI) monetary value is also received from the retail store. The PI monetary value is a product of multiplying a PI value for the selected product with the cost of the selected product. The book inventory monetary value and the PI monetary value are stored in a database. Subsequently, the book inventory monetary value and the PI monetary value are retrieved from the database. A difference between the book inventory monetary value and the PI monetary values is determined. An adjustment of the PI value is determined based upon the difference.

14 Claims, 3 Drawing Sheets

(56) References Cited

U.S. PATENT DOCUMENTS

| | | |
|---|---|---|
| 7,552,066 B1 | 6/2009 | Landvater |
| 7,954,712 B2 | 6/2011 | Babcock |
| 8,195,533 B1 | 6/2012 | Mishra |
| 8,224,717 B2 | 7/2012 | Giacobbe |
| 8,321,303 B1 | 11/2012 | Krishnamurthy |
| 8,346,630 B1 | 1/2013 | McKeown |
| 8,965,796 B1 | 2/2015 | Gala |
| 9,205,886 B1 * | 12/2015 | Hickman ............ G05D 1/0246 |
| 9,415,935 B1 | 8/2016 | MacFarlane |
| 10,360,548 B2 | 7/2019 | Brooks |
| 2003/0216969 A1 | 11/2003 | Bauer |
| 2004/0158507 A1 | 8/2004 | Meek |
| 2006/0157150 A1 * | 7/2006 | Blakeslee ............ B67D 7/08 141/198 |
| 2008/0120205 A1 | 5/2008 | Hoopes |
| 2008/0255968 A1 | 10/2008 | Heinrichs |
| 2008/0270269 A1 | 10/2008 | Myers |
| 2009/0063310 A1 * | 3/2009 | Alonzo ............ G06Q 10/087 705/30 |
| 2009/0101713 A1 | 4/2009 | Ulrich |
| 2009/0157533 A1 | 6/2009 | Ohno |
| 2012/0209734 A1 | 8/2012 | Brooks |
| 2014/0379535 A1 | 12/2014 | Briet |
| 2015/0039373 A1 | 2/2015 | Anand |
| 2016/0171428 A1 | 6/2016 | Gooijer |
| 2016/0371613 A1 | 12/2016 | Ulrich |
| 2017/0200106 A1 | 7/2017 | Jones |
| 2018/0005174 A1 | 1/2018 | Dixon |

OTHER PUBLICATIONS

McClain, John O; Cornell University; "Simulating Inventory Control with Orders that Cross during Lead Time"; http://www.exinfm.com/excel%20files/Inventory_Simulation.xls; Mar. 22, 2002; pp. 1-60.

PCT; App. No. PCT/US2018/012347; International Search Report and Written Opinion dated Mar. 6, 2018.

SAP; "How to Set Up and Manage a Perpetual Inventory System"; SAP; Jun. 22, 2016; pp. 1-108.

Trujillo, Paul; "Walmart is Addressing Inventory Problems With a New System"; http://www.waspbarcode.com/buzz/walmart-2/; Nov. 15, 2016; pp. 1-7.

USPTO; U.S. Appl. No. 15/862,406; Notice of Allowance dated Mar. 22, 2019.

USPTO; U.S. Appl. No. 15/862,406; Office Action dated Aug. 6, 2018.

USPTO; U.S. Appl. No. 15/862,406; Office Action dated Dec. 6, 2018.

* cited by examiner

SYSTEM AND METHOD FOR MANAGEMENT OF PERPETUAL INVENTORY VALUES BASED UPON FINANCIAL ASSUMPTIONS

CROSS-REFERENCE TO RELATED APPLICATION

This application claims the benefit of the following U.S. Provisional Application No. 62/471,437 filed Mar. 15, 2017, which is incorporated herein by reference in its entirety.

TECHNICAL FIELD

This invention relates generally to the management of perpetual inventory values, and more particularly, to the management of perpetual inventory values utilizing financial assumptions.

BACKGROUND

Stores utilize various measures to keep track of and manage products. One such measure is the perpetual inventory (PI) value associated with a product. In aspects, the PI value represents the quantity of product in the store. The PI value typically changes over time so as to accurately reflect the number of actual products in the store. For instance, products are purchased by customers and removed from the store affecting the PI value. Shipments arrive at the store and include additional products also affecting the PI value.

Stores also utilize other measures that relate to the value and availability of products for accounting and other purposes. For example, a book value of a product may be the value of all of the product present in the retail store.

Sometimes the PI value does not accurately reflect the correct number of products in the store. This can happen for a variety of reasons including mis-scanning products as the products leave or depart the store, or other forms of human error. If the PI value is incorrect, then various problems can develop. For instance, shipments can be ordered at the wrong times and for the wrong quantity of products.

BRIEF DESCRIPTION OF THE DRAWINGS

Disclosed herein are embodiments of systems, apparatuses and methods pertaining to managing perpetual inventory values. This description includes drawings, wherein.

Figure 1:
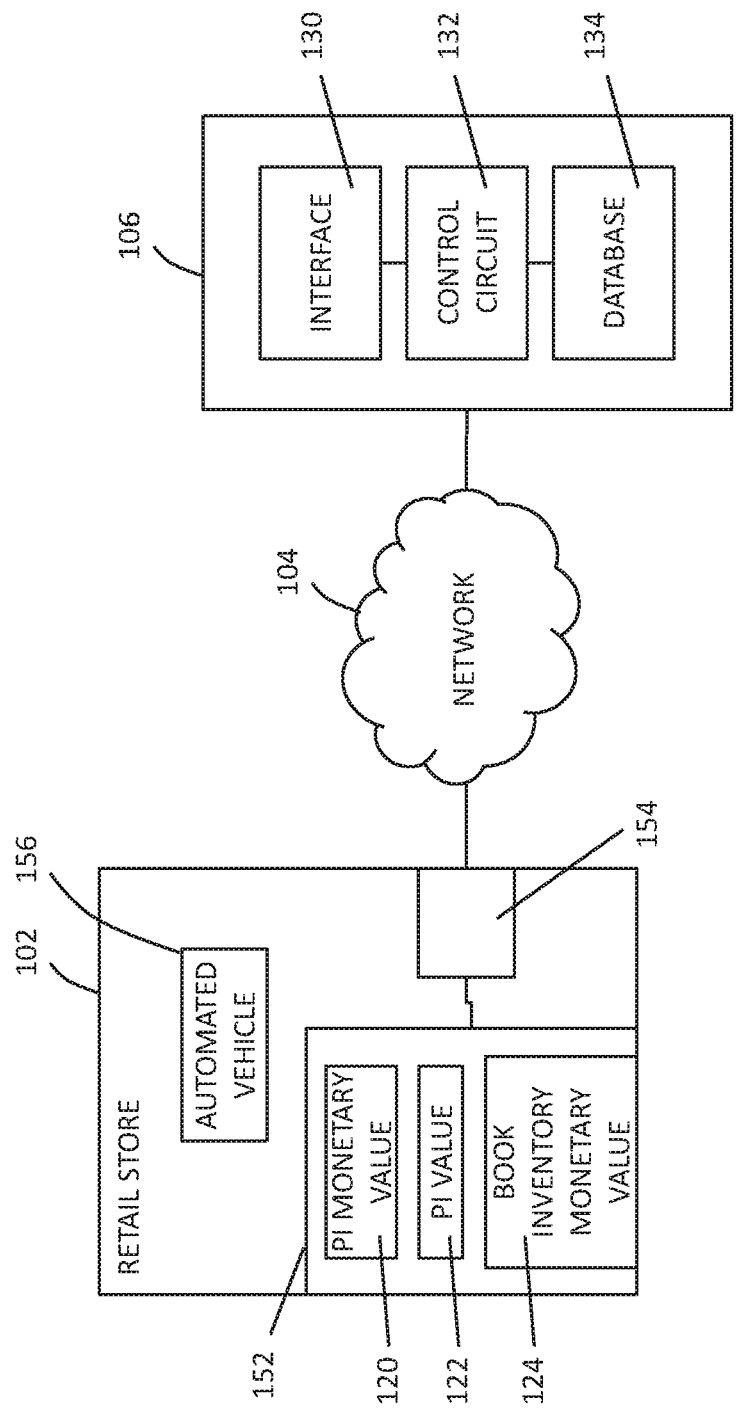
FIG. 1 is a block diagram showing one example of a system that adjusts the PI of a product in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, systems, apparatuses and methods are provided that adjust perpetual inventory values. Advantageously, financial assumptions are used to determine PI value adjustments. In aspects, the difference between the book value of an item and the PI value of a product multiplied by the product cost is determined. In some aspects, the amount of the adjustment to the PI value is proportional to the magnitude of the difference, and the sign of the difference determines whether the PI is increased or decreased.

In some of these embodiments, a system that manages perpetual inventory (PI) values of products in a retail store, includes an interface, a database, and a control circuit.

The interface is configured to receive from a retail store a book inventory monetary value of a selected product in the retail store. The book inventory monetary value is a monetary value of the selected product according to accounting records of the retail store. The interface is also configured to receive a perpetual inventory (PI) monetary value from the retail store. The PI monetary value is a product of multiplying a PI value for the selected product with the cost of the selected product.

The database is configured to store the book inventory monetary value and the PI monetary value. The database may be any type of memory storage device.

The control circuit is coupled to the interface and the database. The control circuit is configured to retrieve the book inventory monetary value and the PI monetary value from the database and to determine a difference between the book inventory monetary value and the PI monetary value. The control circuit is further configured to determine an adjustment of the PI value based upon the difference. In aspects, the control circuit is configured to transmit the adjustment of the PI value to the retail store.

In some examples, the difference has a magnitude and a sign, and the magnitude and the sign determine the adjustment of the PI value. In some aspects, the sign determines that the PI is increased, while in other aspects the sign determines that the PI is decreased.

In other examples the control circuit is configured to perform a plurality of actions based upon the difference. In aspects, one of the plurality of actions is sending an alert to a store employee. In examples, the system further includes a user interface, and the actions are selectable by a user at the user interface.

In others of these embodiments, a book inventory monetary value of a selected product in a retail store is received. The book inventory monetary value is the monetary value of the selected product according to the accounting records of the retail store.

A perpetual inventory (PI) monetary value is also received from the retail store. The PI monetary value is a product of multiplying a PI value for the selected product with the cost of the selected product. The book inventory monetary value and the PI monetary value are stored in a database.

Subsequently, the book inventory monetary value and the PI monetary value are retrieved from the database. A difference between the book inventory monetary value and the PI monetary values is determined. An adjustment of the PI value is determined based upon the difference.

In still others of these embodiments, a system manages perpetual inventory (PI) values of products in a retail store. The system includes a transceiver circuit, an automated vehicle, a network, and interface, a database, and a control circuit.

The transceiver circuit and the automated vehicle are disposed at the retail store. The network is coupled to the transceiver circuit.

The interface is disposed at a central processing center and coupled to the network. The interface is configured to receive from the retail store via the network, the book inventory monetary value of the selected product and the PI monetary value of the selected product, or information utilized to determine the book inventory monetary value of the selected product and the PI monetary value of the selected product. The book inventory monetary value is a monetary value of the selected product according to accounting records of the retail store. The PI monetary value is a product of multiplying a PI value for the selected product with the cost of the selected product.

The database is disposed at a central processing center. The database is configured to store the PI value for the selected product, the book inventory monetary value, and the PI monetary value.

The control circuit is disposed at a central processing center, and is coupled to the interface and the database. The control circuit is configured to retrieve the book inventory monetary value and the PI monetary value from the database. The control circuit is further configured to determine a difference between the book inventory monetary value and the PI monetary value. The control circuit is further configured to, when the difference is above a predetermined threshold, transmit instructions to the automated vehicle via the network to perform an investigation concerning the status of the selected product in the retail store. The control circuit is configured to receive results of the investigation via the interface, and determine an adjustment of the PI value of the selected product based upon the difference, the results of the investigation, and adjustments made to the PI value of the selected product at other retail stores.

Referring now to FIG. 1, one example of a system 100 for adjusting the PI value of a selected product in a retail store 102 is described. The retail store 102 may be any type of retail store, for example, a discount center, a grocery store, a department store, or a hardware store to mention a few examples.

The retail store 102 includes a database 152 that stores for each product a PI value 122. The PI value 122 for the selected product indicates the amount of a selected product in the retail store.

A communication device 154 allows the retail store 102 to communicate with devices and entities that are external to the store. The communication device 154 may include any combination of hardware or software that allows communications to be received at the retail store 102, and makes transmissions from the retail store 102. In one example, the communication device 154 may be a transceiver circuit. The communication device 154 may be deployed within or at another device (e.g., a modem, a smart phone, or a personal computer, to mention a few examples).

Cloud network 104 is coupled to the communication device 154 (e.g., a transceiver) at the retail store 102. The cloud network 104 may be any type of computer or communication network and may include routers, gateways, and servers to mention a few examples of devices that can form or be utilized in the network 104. The cloud network 104 may also be combinations of various types of networks.

The apparatus 106 includes an interface 130, a control circuit 132, and a database 134. The interface 130 is configured to receive from the retail store 102 the perpetual inventory (PI) value 122 associated with the selected product (or information from which the PI value 122 can be calculated). The database 134 stores the PI value 122.

In aspects, the apparatus 106 may be disposed at a central processing center or location such as a business headquarters. In other examples, the apparatus 106 is disposed at one or more remote locations (e.g., retail stores). Advantageously, disposing the apparatus at a central processing center reduces data storage cost, since all data can be stored at a single location instead of at multiple locations.

The control circuit 132 is coupled to the interface 130 and the database 134. The control circuit 132 is configured to obtain the PI value 122 from the database 134. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 132 may be configured (for example, by using corresponding programming stored in a memory as will be well understood by those skilled in the art) to carry out one or more of the steps, actions, and/or functions described herein.

The interface 130 is configured to receive from the retail store 102 a book inventory monetary value 124 of a selected product in the retail store. The book inventory monetary value 124 is a monetary value of the selected product according to accounting records of the retail store 102. The interface 130 is also configured to receive a perpetual inventory (PI) monetary value 120 from the retail store. The PI monetary value 120 is a product of multiplying the PI value 122 for the selected product with the cost of the selected product. The database 134 is configured to store the book inventory monetary value 124 and the PI monetary value 120. In other examples, the PI value 122 may be stored at the database 134 as well as the cost of the selected product, and the control circuit 132 may calculate the PI monetary value 120. Alternatively, information needed to calculate the PI monetary value 120 and the book inventory monetary value 124 may be received at the apparatus 106. The apparatus 106 may then use this information to calculate the actual PI monetary value 120 and the actual book inventory monetary value 124. This information may include sales information or product values to mention two examples.

The control circuit 132 is configured to retrieve the book inventory monetary value 124 and the PI monetary value 120 from the database 134 and to determine a difference between the book inventory monetary value 124 and the PI monetary value 120. The control circuit 132 is further configured to determine an adjustment of the PI value based upon the difference. In aspects, the control circuit 132 is configured to transmit the adjustment of the PI value to the retail store 102.

In aspects, the amount of the adjustment to the PI value is proportional to the magnitude of the difference. In examples, the sign of the difference determines whether the PI is increased or decreased.

In some examples, the PI value 122 is also transmitted and stored in the database 134. The adjustment is applied to the PI value 122 and the adjusted PI value is transmitted to the retail store 102 (instead of the adjustment).

In still other aspects, adjustments made to the PI value 122 of the selected product may be additional based upon adjustments to the PI value made at other retail stores. The magnitude of PI adjustments made at other stores may be stored at the database 134. For example, if the PI value has been adjusted by certain percentage at a predetermined number of other stores, then this information may be considered in adjusting the PI value 122 at the present store. In this way, knowledge and experience gained in PI adjustments made at other stores can be utilized in adjustments to the PI value at the present store to provide a more accurate PI value.

In aspects, the control circuit 132 is further configured to, when the difference is above a predetermined threshold, transmit instructions to an automated vehicle 156 via the network 104 to perform an investigation concerning the status of the selected product in the retail store 102. The automated vehicle 156 may be an automated ground vehicle or aerial drone, to mention two examples.

Figure 2:
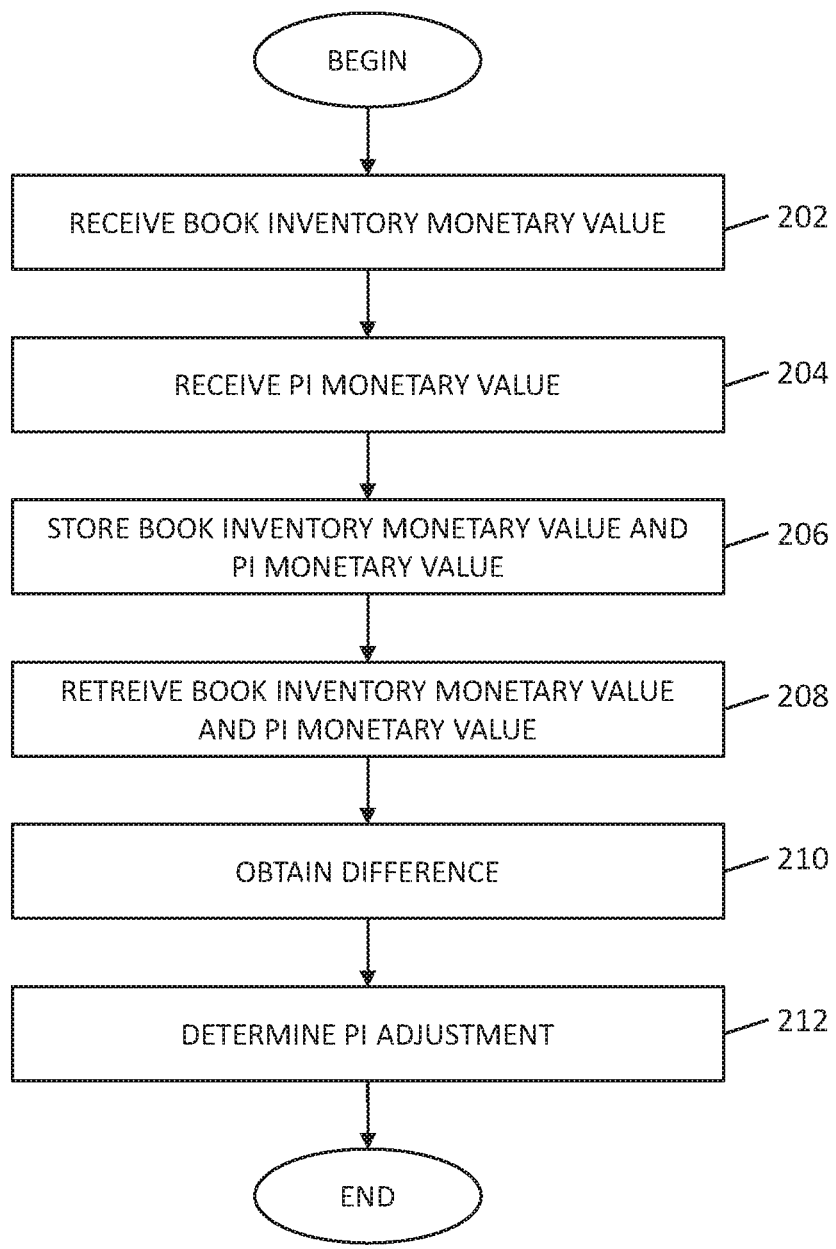
FIG. 2 is a flowchart showing one example of an approach for adjusting the PI of a selected product in accordance with some embodiments.

Referring now to FIG. 2, one example of an approach for adjusting the PI value using financial considerations is described. In one example, the approach of FIG. 2 is performed at a central processing center. In another example, the approach of FIG. 2 is performed at a retail store. At step 202, a book inventory monetary value of a selected product in the retail store is received. The book inventory monetary value is the monetary value of the selected product according to the accounting records of the retail store. Alternatively, information needed to determine the book inventory monetary value is received, and this information used to calculate the book inventory monetary value.

At step 204, a perpetual inventory (PI) monetary value is also received from the retail store. The PI monetary value is a product of multiplying a PI value for the selected product with the cost of the selected product. Alternatively, information needed to determine the PI monetary value is received, and this information used to calculate the PI monetary value.

At step 206, the book inventory monetary value and the PI monetary value are stored in a database. The database may be any type of memory storage device.

Subsequently, at step 208, the book inventory monetary value and the PI monetary value are retrieved from the database.

At step 210, a difference between the book inventory monetary value and the PI monetary values is determined. In formula form:

Difference=book inventory monetary value−(PI value*cost of the product).

The difference includes a magnitude and a sign. In aspects, a negative sign of the difference indicates that the PI value is too high (an overstated PI), while a positive sign for the difference may indicate that the PI value is too low (an understated PI).

At step 212, an adjustment of the PI value is determined based upon the difference. In aspects, the amount of the adjustment to the PI value is proportional to the magnitude of the difference. For example, there may be a one-to-one correspondence between the different and the magnitude of the PI adjustment. In other aspects, the sign of the difference determines whether the PI is increased or decreased.

Other approaches may also be used to determine the adjustment. For example, the difference may be divided by the PI monetary value, the book inventory monetary value, or the summation of both values to obtain a percentage value. Then, the percentage value may be multiplied by another factor and the resultant product is the PI adjustment value. In one example, the other factor is 100. Thus, a 1% difference may result in a PI adjustment value of 1.

In still other aspects, adjustments made to the PI value of the selected product may be additional based upon adjustments to the PI value made at other retail stores. For example, if the PI value has been adjusted by certain percentage at a predetermined number of other stores, then this information may be considered in adjusting the PI value at the present store. In this way, knowledge and experience gained in PI adjustments made at other stores can be utilized in adjustments to the PI value at the present store to provide a more accurate PI value.

In some other examples, the PI value may not always be adjusted. To take one example, when the percentage value (or difference) becomes too high (or the magnitude of the difference is above a predetermined value), then adjustments to the PI value are not made. In aspects, if the percentage (or absolute magnitude) of the difference is too high, a store employee (or a central processing center such as a home office) may be alerted to investigate before any PI adjustment is attempted.

In still other examples, when the difference is above a predetermined threshold, instructions are transmitted to an automated vehicle to perform an investigation concerning the status of the selected product in the retail store. For example, the automated vehicle (using sensors) may confirm the amount of product in the store and/or the location of the product.

Figure 3:
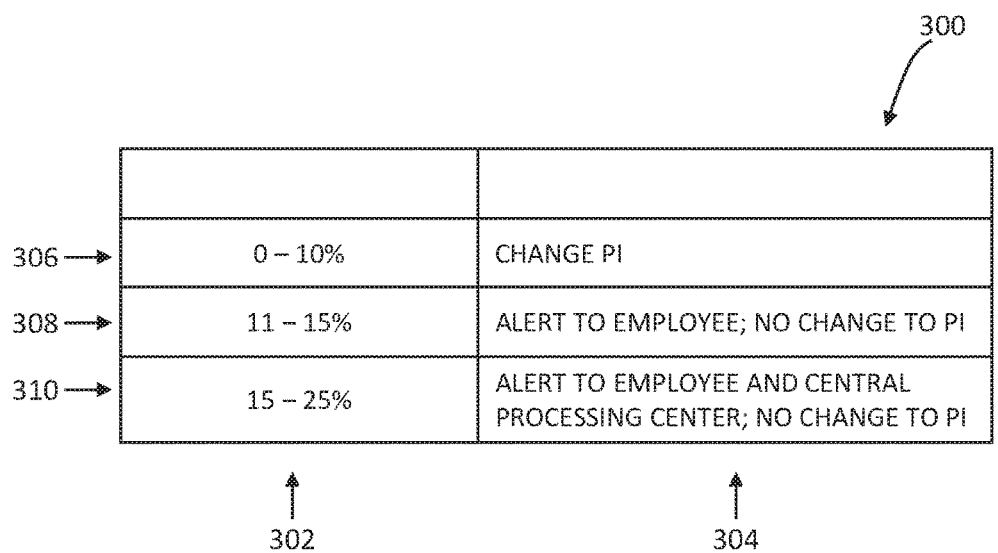
FIG. 3 is a flowchart showing another example of an approach for taking actions including selectively adjusting the PI of a selected product in accordance with some embodiments.

Referring now to FIG. 3, one example of an approach for adjusting the PI value is described. The difference between the book inventory monetary value (book inventor monetary value 124 in FIG. 1) and the PI monetary value (PI monetary value 120 in FIG. 1) is obtained. In some aspects, the difference may be divided by the PI monetary value, the book inventory monetary value, or the summation of both values to obtain a percentage.

Referring now to FIG. 3, a look-up table 300 may be used to store actions that correspond to certain percentage ranges. A first column 302 represents the percentage (calculated above) and a second column 304 represents an action. The look-up table 300, in aspects may be stored at a database at a central processing center. In other examples, the look-up table 300 is stored at a database at the retail store.

A first row 306 has a percentage of 0-10% and the PI value will be adjusted under these circumstances. A second row 308 has a percentage of 11-15% and an alert is to be issued to an employee at the store. Additionally, the PI value will not be adjusted under these circumstances. A third row 310 has a percentage of 15-25% and an alert is to be issued to an employee at the store, and another alert is to be issued to a central processing center (e.g., the home office of the retail store. Additionally, the PI value will not be adjusted under these circumstances.

It will be appreciated that the example of FIG. 3 can be modified to replace percentages by absolute difference values. Additionally, the table 300 may be stored in a data base (e.g., the database 130 of FIG. 1) and may be any type of appropriate data structure.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system that manages perpetual inventory (PI) values of products in a retail store, the system comprising:
   a first retail store including a first quantity of a product, the first quantity represented as a first PI value, wherein the first PI value has been previously adjusted according to a first adjusted PI percentage;
   a second retail store including a second quantity of the product, the second quantity represented as a second PI value, wherein the second PI value has been previously adjusted according to a second adjusted PI percentage;
   a third retail store, the third retail store including a third quantity of the product that is presented to customers at a predetermined location within the third retail store, the third quantity represented as a third PI value;
   a central processing center located at a central location and communicating with the first, second, and third retail stores;
   a transceiver circuit disposed at the third retail store;
   an automated vehicle being an aerial drone or automated ground vehicle, the automated vehicle being disposed at the third retail store, wherein the automated vehicle includes a sensor that is configured to sense information related to the amount of product in the store and the location of the product;
   a network, the network being coupled to the transceiver circuit;
   an interface disposed at the central processing center and coupled to the network, the interface configured to receive from the third retail store via the network the book inventory monetary value of the selected product and the PI monetary value of the selected product, the book inventory monetary value being a monetary value of the selected product according to accounting records of the third retail store, the book inventory monetary value having a value in monetary units, the PI monetary value being a product of multiplying the third PI value for the selected product with the cost of the selected product, the PI monetary value having a value in monetary units, the interface also receiving the first adjusted PI percentage from the first retail store and the second adjusted PI percentage from the second retail store;
   a database disposed at a central processing center, that is configured to store the third PI value for the selected product, the book inventory monetary value, and the PI monetary value;
   a control circuit disposed at a central processing center, the control circuit being coupled to the interface and the database, the control circuit configured to:
      retrieve the book inventory monetary value and the PI monetary value from the database;
      determine a difference between the book inventory monetary value and the PI monetary value;
      when the difference is above a predetermined threshold, transmit instructions to the automated vehicle via the network to perform an investigation concerning the status of the selected product in the third retail store;
   wherein the automated vehicle is configured to receive the instructions and responsively perform the investigation by navigating through the third retail store on the ground or through the air and confirming that the third quantity of the product is actually present in the third retail store and the location of the product within the third retail store;
   wherein when the first PI percentage and the second PI percentage are above a first predetermined threshold and the results of the investigation confirm the product exists in the third retail store, the control circuit determines an adjustment to the third PI value, the adjustment based upon the first PI percentage, the second PI percentage, a magnitude of the difference between the book inventory monetary value and the PI monetary value, and a sign of the difference between the book inventory monetary value and the PI monetary value;
   wherein the adjustment is applied to the third PI value, the adjusted third PI value is selectively used to reorder products that are subsequently shipped to the third retail store, and the third PI value is adjusted as shipments are received and as purchases are made of the products at the point-of-of sales devices at the third retail store.

2. The system of claim 1, wherein the control circuit is configured to transmit the adjustment of the third PI value to the third retail store.

3. The system of claim 1, wherein the sign of the difference determines that the third PI value is increased.

4. The system of claim 1, wherein the sign of the difference determines that the third PI value is decreased.

5. The system of claim 1, wherein the control circuit is configured to perform a plurality of actions based upon the difference.

6. The system of claim 5, wherein one of the plurality of actions is sending an alert to a store employee.

7. The system of claim 5, further comprising a user interface, and wherein the actions are selectable by a user at the user interface.

8. A method of managing perpetual inventory (PI) values of products in a retail store, the method comprising:
   providing a first retail store including a first quantity of a product at the first retail store, the first quantity represented as a first PI value, wherein the first PI value has been previously adjusted according to a first adjusted PI percentage;
   providing a second retail store including a second quantity of the product at the second retail store, the second quantity represented as a second PI value, wherein the second PI value has been previously adjusted according to a second adjusted PI percentage;
   providing a third retail store, the third retail store including a third quantity of the product that is presented to customers at a predetermined location within the third retail store, the third quantity represented as a third PI value;
   disposing an automated vehicle disposed at the third retail store, the automated vehicle being an aerial drone or automated ground vehicle, wherein the automated vehicle includes a sensor that is configured to sense information related to the amount of product in the third retail store and the location of the product in the third retail store;

receiving at a central processing center from the third retail store via a network the book inventory monetary value of the selected product and the PI monetary value of the selected product, the book inventory monetary value being a monetary value of the selected product according to accounting records of the retail store, the book inventory monetary value having a value in monetary units, the PI monetary value being a product of multiplying a third PI value for the selected product with the cost of the selected product, the PI monetary value having a value in monetary units;

receiving the first adjusted PI percentage from the first retail store and the second adjusted PI percentage from the second retail store;

storing in a database at the central processing center, the third PI value for the selected product, the book inventory monetary value, and the PI monetary value;

at a control circuit disposed at a central processing center:

retrieving the book inventory monetary value and the PI monetary value from the database;

determining a difference between the book inventory monetary value and the PI monetary value;

when the difference is above a predetermined threshold, transmitting instructions to the automated vehicle via the network to perform an investigation concerning the status of the selected product in the retail store;

wherein the automated vehicle is configured to receive the instructions and responsively perform the investigation by navigating through the third retail store on the ground or through the air and confirming that the third quantity of the product is actually present in the third retail store and the location of the product within the third retail store;

wherein when the first PI percentage and the second PI percentage are above a first predetermined threshold and the results of the investigation confirm the product exists in the third retail store, the control circuit determines an adjustment to the third PI value, the adjustment based upon the first PI percentage, the second PI percentage, a magnitude of the difference between the book inventory monetary value and the PI monetary value, and a sign of the difference between the book inventory monetary value and the PI monetary value;

wherein the adjustment is applied to the third PI value, the adjusted third PI value is selectively used to reorder products that are subsequently shipped to the third retail store, and the third PI value is adjusted as shipments are received and as purchases are made of the products at the point-of-of sales devices at the third retail store.

9. The method of claim 8, further comprising transmitting the adjustment of the third PI value to the third retail store via the network.

10. The method of claim 9, wherein the sign of the difference determines that the third PI value is increased.

11. The method of claim 9, wherein the sign of the difference determines that the third PI value is decreased.

12. The method of claim 8, further comprising performing a plurality of actions based upon the difference.

13. The method of claim 12, wherein one of the plurality of actions is sending an alert to a store employee.

14. The method of claim 12, further comprising selecting the plurality of actions at a user interface.

* * * * *